March 5, 1929.    E. A. CLARK    1,704,426
POWER CONTROL
Filed July 23, 1927
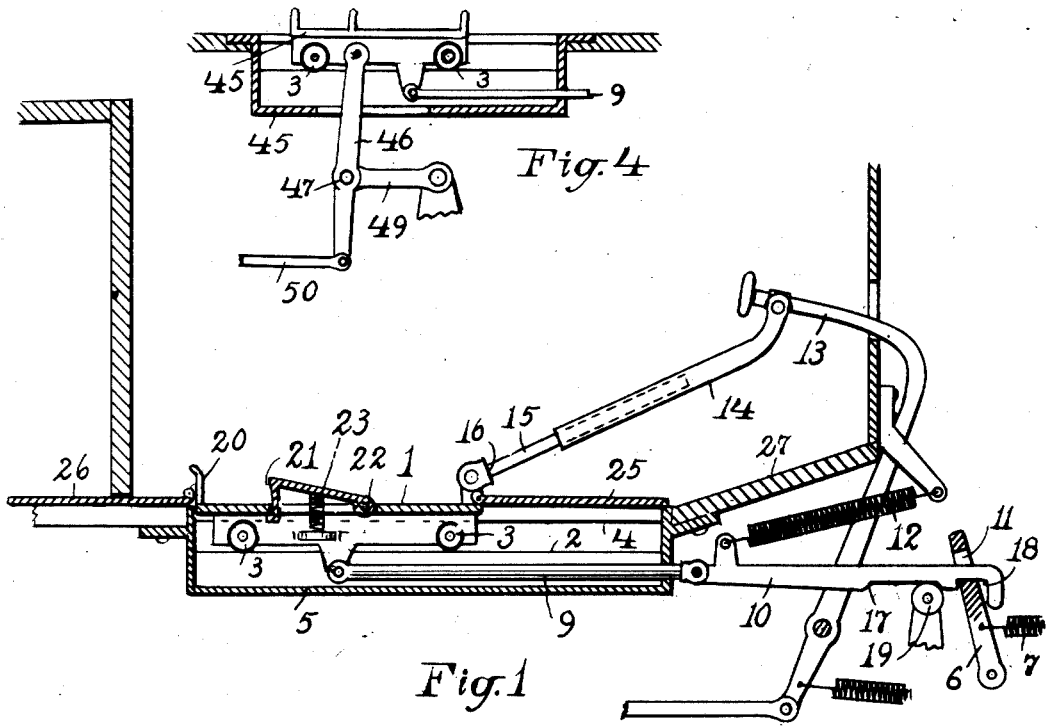
Fig. 4
Fig. 1
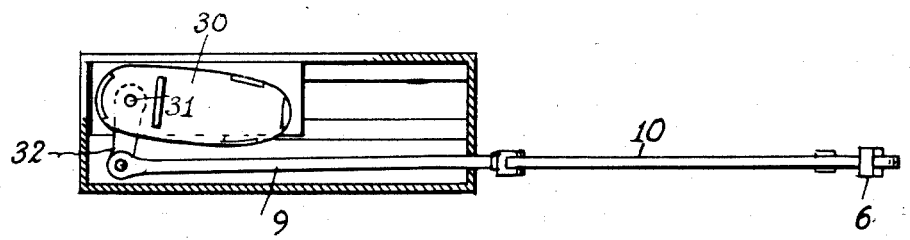
Fig. 2
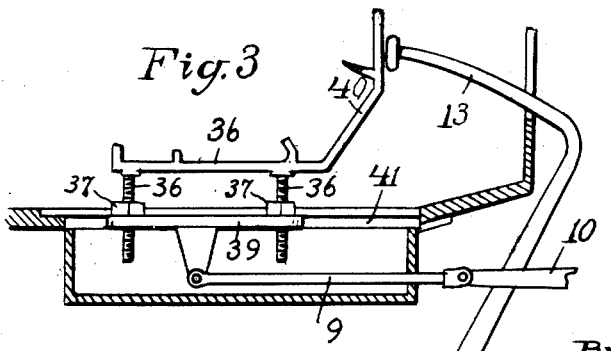
Fig. 3
Inventor,
Ewen A. Clark;
By A. B. Upham,
Attorney.

Patented Mar. 5, 1929.

1,704,426

UNITED STATES PATENT OFFICE.

EWEN A. CLARK, OF BOSTON, MASSACHUSETTS.

POWER CONTROL.

Application filed July 23, 1927. Serial No. 207,973.

This invention relates to automobiles, trucks and the like, and has for its object the effecting of a simple and convenient means for controlling the power of the same, whether steam or gasoline; and it is especially designed for connection with the braking and clutching mechanism, and also with the accelerator arm of an internal combustion engine.

In carrying out the invention, I provide the floor of the car with a reciprocative device adapted to be connected either with the brake mechanism or other control mechanism, or with two thereof each connected separately with one of the control mechanisms, as the clutch pedal and the brake mechanism. I also adapt the device, when connected with the brake mechanism, to control the accelerator arm, or when connected with the clutch lever to control this arm.

In the drawings forming part of this specification, Fig. 1 is a side sectional view of parts of an automobile showing an embodiment of my invention applied thereto. Fig. 2 is a plan view of a portion of another form of the invention. Fig. 3 is a sectional elevation of another form of the invention. Fig. 4 is a sectional elevation of still another modification thereof.

The slide or foot piece 1 is preferably sunk in the floor of the car between the driver's seat and the dashboard, and preferably in the level portion of the floor. This foot piece slides forward and back upon suitable ways 2, being illustrated with rollers or wheels 3 for making the movements easier; the rails 4 being provided for keeping it from rising out from its place. To keep the air from rising through the space about the foot piece, it is encased beneath by a box 5 wholly closing the aperture through the floor needed for the reciprocation of the foot piece.

The first function of the foot piece is the control of the accelerator arm 6 which is normally urged to its low limit of closure by a tension spring 7. This spring can not wholly cut out the charge from the engine, but brings the arm to a point at which the charge admitted will keep the engine from stalling.

From the foot piece 1 a rod 9 passes out through the forward end of the box 5, and is pivoted at its outer end to a bar 10 whose free end enters a slot 11 in the accelerator arm 6 and is notched for engaging the latter. Thus, by sliding the foot piece back and forth, the accelerator arm is correspondingly adjusted, and the engine made to run faster or slower as desired. A tension spring 12 attached to a lug rising from the bar 10 serves both to hold the notch 18 in its engagement with the accelerator arm, and likewise to yieldingly hold the foot piece in a forward position at which the bar is holding the accelerator arm in its position of low charge-delivery.

The foot piece 1 is connected with the brake pedal 13, or with the clutch pedal or other power lever, or there may be a like foot piece for each or any two in the same car; but I prefer to unite it to the brake pedal. The connection consists of a tubular section 14 and a rod 15 slidable within the tube; the length of the latter being such that when the shoulder 16 reaches the end of the tube 14, the foot piece is holding the accelerator at its point of minimum delivery. Now, when the driver presses the foot piece farther forward in order to put on the brakes, a shoulder 17 of the bar 10, which is touching a supporting wheel 19, rides up on this wheel and thereby raises the notch 18 out of its engagement with the accelerator arm, and so permits the foot piece to advance far enough to swing the brake lever 13 to its full braking position.

For starting the car again, the foot piece is drawn backward, releasing the brakes, and also re-engaging the accelerator arm 6, and permitting the desired amount of charge to be delivered to the engine.

In the operation of this arrangement the driver rests his foot upon the foot piece, and his heel back against the heel piece 20 to enable him to press it rearward. For enabling him to better exert a brake-applying pressure to the foot piece, it is provided with a shoulder 21 designed to be directly in front of the breast of his heel, whereby he can urge the foot piece forward by the engagement of his heel with the shoulder 21. I prefer to have the latter hinged in the foot piece at 22 and normally held upward by a spring 23, so that when the driver steps into the car and his foot comes upon the shoulder 21, it will yield thereto.

To enclose the space in front of and behind the foot piece 1, I hinge the flaps 25 and 26 thereto; the front flap 25 sliding up the inclined portion 27 of the floor, and the rear flap sliding in beneath the seat.

The modification of the invention shown in Fig. 2 has a foot piece 30 pivoted at 31 to swing laterally, and is connected by an arm 32 with the rod 9 and bar 10. The driver merely swings his foot laterally for the control of the accelerator arm, but urges it forward for the application of the brakes.

It is evident that the sliding carriage or foot piece can be disconnected from the accelerator arm, and so control alone the power lever connected therewith; likewise, the same car may be provided with a plurality thereof, each connected with one of the power levers.

In the form of the invention shown in Fig. 3, the foot piece 36 is supported by means of threaded studs 36 adjusted by nuts 37 on the slide 39; the foot piece having an upwardly projecting arm 40 rigid therewith adapted to come against the pedal 13 for the application of the brakes, but having the rod 9 and bar 10 disposed as above described. This vertical adjustment of the foot piece 36 is for the purpose of shifting the same to suit people of different lengths of leg. In this modification, there are no anti-friction rolls, but good lubrication is depended upon for the free movement of the slide 39 in the ways 41.

In the construction shown in Fig. 4, the brake pedal is omitted, and the carriage 45 is connected with the brake rod 50 by means of a lever 46 pivotally supported by means of a rocking arm 49, so that as the carriage is moved forward, the braking mechanism is operated.

What I claim as my invention is:

1. The combination with a power control means of an automobile and the like, of a device slidable in a straight line longitudinally along the floor of the automobile, and connected with said means for the operation of the latter by the sliding movements of said device actuated by the foot of the driver of the automobile.

2. The combination in an automobile and the like, of a foot piece slidable along the floor of the automobile, and connection between the same and the accelerator of the engine.

3. The combination with a power control lever, of an automobile and the like, of a foot piece slidable along the floor of the automobile and connected with both the said lever and the accelerator arm of the engine.

4. The combination with a power control lever of an automobile and the like, of a foot piece slidable in the floor of the automobile connected with both said lever and the accelerator, said connection permitting the accelerator to be nearly shut off before the said lever is operated.

5. The combination with a power control lever of an automobile and the like, of a foot piece slidable along the floor of the automobile toward and from the dash board, and connections between said foot piece and said lever and with the accelerator arm of the engine whereby the movement of said foot piece toward the dash board adjusts the said arm to its minimum limit, and is then disengaged therefrom to permit further movement to operate the said lever.

6. The combination with a power control lever of an automobile and the like, of a foot piece slidable along the floor of the automobile toward and from the dash board, connection between said foot piece and the accelerator arm of the engine comprising a pivoted bar releasably engaging the said arm, and connection between said foot piece and said lever comprising a tubular portion and a rod slidable in said tubular portion to permit the foot piece to control and release said arm before further forward movement of said foot piece causes said rod and tube to set the said lever.

7. A structure as set forth in claim 5 wherein the foot piece is provided with a heel enclosure.

8. A structure as set forth in claim 5, wherein the foot piece is provided with a projection for engaging the rear of the driver's heel, and a spring-upheld shoulder for the breast of the heel.

9. A structure as set forth in claim 5, wherein the foot piece is provided with an enclosing box having ways, and the foot piece has antifriction rolls engaging said ways.

10. A structure as set forth in claim 5, wherein the foot piece is provided with an enclosing box set into the floor of the automobile, and the connection with the accelerator arm includes a rod attached at one end to said foot piece and passes outward through an end of said box.

In testimony that I claim the foregoing invention, I have hereunto set my hand this 22nd day of July, 1927.

EWEN A. CLARK.